US006635196B1

(12) United States Patent
Goggins (10) Patent No.: US 6,635,196 B1
(45) Date of Patent: Oct. 21, 2003

(54) MOLDED ARTICLES HAVING A SURFACE BEARING A LENTICULAR IMAGE

(75) Inventor: Timothy P. Goggins, Nashotah, WI (US)

(73) Assignee: National Graphics, Inc., Brookfield, WI (US)

( * ) Notice: Subject to any disclaimer, the term of this patent is extended or adjusted under 35 U.S.C. 154(b) by 119 days.

(21) Appl. No.: 09/718,695

(22) Filed: Nov. 22, 2000

Related U.S. Application Data (60) Provisional application No. 60/211,112, filed on Jun. 12, 2000.

(51) Int. Cl.[7] .............................................. B29D 11/00
(52) U.S. Cl. ..................... 264/1.7; 264/132; 264/328.12
(58) Field of Search .......................... 264/1.1, 1.7, 1.9, 264/132, 1.31, 1.32, 255, 328.1, 328.12; 359/619

(56) References Cited

U.S. PATENT DOCUMENTS

| 3,839,129 A | * | 10/1974 | Neumann |
| 4,406,045 A | * | 9/1983 | Schwab |
| 4,576,850 A | | 3/1986 | Martens ..................... 428/156 |
| 4,582,885 A | | 4/1986 | Barber ......................... 528/28 |
| 4,668,558 A | | 5/1987 | Barber ....................... 428/156 |
| 4,906,315 A | | 3/1990 | McGrew ..................... 156/231 |
| 5,113,213 A | | 5/1992 | Sandor et al. ................. 355/22 |
| 5,266,995 A | | 11/1993 | Quadracci et al. ............. 355/77 |
| 5,457,515 A | | 10/1995 | Quadracci et al. ........... 355/132 |
| 5,488,451 A | | 1/1996 | Goggins ........................ 355/77 |
| 5,494,445 A | * | 2/1996 | Sekiguchi et al. |
| 5,514,427 A | | 5/1996 | Ellison et al. ................. 428/31 |
| 5,617,178 A | | 4/1997 | Goggins ........................ 355/22 |
| 5,642,226 A | | 6/1997 | Rosenthal .................... 359/619 |
| 5,720,123 A | * | 2/1998 | Taylor |
| 5,847,808 A | | 12/1998 | Goggins ........................ 355/22 |
| 5,896,230 A | | 4/1999 | Goggins ..................... 359/619 |
| 5,951,939 A | | 9/1999 | Chernyak et al. ............ 264/522 |
| 5,967,032 A | | 10/1999 | Bravenec et al. ............ 101/211 |
| 5,968,444 A | | 10/1999 | Yamamoto ................... 264/519 |
| 5,972,279 A | | 10/1999 | Harris et al. ................. 264/513 |
| 5,985,198 A | | 11/1999 | Harris et al. ................. 264/255 |
| RE36,457 E | | 12/1999 | Ellison et al. ................. 428/31 |
| 6,001,208 A | | 12/1999 | Kinoshita et al. ........... 156/245 |
| 6,424,467 B1 | | 7/2002 | Goggins ..................... 359/626 |
| 6,490,092 B1 | | 12/2002 | Goggins ..................... 359/619 |
| 6,490,093 B2 | | 12/2002 | Guest ......................... 359/619 |

FOREIGN PATENT DOCUMENTS

| EP | 0 410 708 A2 | 7/1990 | ........... B29C/45/14 |
| EP | 0 502 672 A2 | 2/1992 | ........... B29C/45/14 |
| EP | 0 615 827 A1 | 9/1994 | ........... B29C/45/14 |
| JP | 5-112351 | * 5/1993 | |

* cited by examiner

*Primary Examiner*—Mathieu D. Vargot
(74) *Attorney, Agent, or Firm*—Whyte Hirschboeck Dudek SC (57) ABSTRACT

Disclosed herein is a molded article bearing a lenticular image on its surface that is prepared by a method comprising the steps of:

A. providing a mold in which to form the molded article;

B. inserting a lenticular image into the mold;

C. introducing a molten plastic into the mold to form the molded article with the lenticular image attached to a surface of the molded article; and D. removing the molded article with the attached lenticular image from the mold.

16 Claims, 5 Drawing Sheets

MOLDED ARTICLES HAVING A SURFACE BEARING A LENTICULAR IMAGE

This application claims the benefit of Provisional application No. 60/211,112 filed Jun. 12, 2000.

BACKGROUND OF THE INVENTION

The present invention relates generally to molded articles. In one aspect, the invention comprises molded articles bearing a surface image while in another aspect, the invention relates to molded articles bearing a lenticular image. In yet another aspect, the invention pertains to a method of making molded articles bearing an image, and more particularly, a lenticular image.

Molded articles and their methods of manufacture are well known in the art. Typically, these articles are molded from any one of a number of common plastics, e.g., ABS, acrylic, polystyrene, polyethylene, polypropylene, PET, nylon, polycarbonate, and the like, and these articles are molded into any one of a host of different sizes and shapes, e.g., telephone, compact disc and cosmetic cases, cups, bottles, promotional items, automobile and appliance parts, etc. These products are molded or shaped by any one of a number of different processes, e.g., injection molding, resin transfer molding, blow molding, pressure molding, and the like. Such parts can be complex, that is, comprising more than one injection molded part. For example, a cosmetic case can include an opaque portion and a separately or even simultaneously molded clear portion.

The aesthetic quality of a molded plastic part is, of course, dependent in large part upon its ultimate use. For those products that are used in applications in which their use is not visible to an end user, e.g., fasteners, plugs, etc., the aesthetics of the product are of little, if any, importance. For those products that are used in applications in which their use is visible to an end user, or in which their appearance is important to their sale, e.g., promotional items, automobile and appliance facie, cups, bottles, bottle caps/enclosures, snowboards or wake boards, skis (e.g., water, snow), cameras, computer cases (e.g., laptop cases), cell phone (or other electronic) cases, cosmetic cases, collectibles, signs, magnets, coasters, display posters, menu boards, postcards, business cards, and packaging on boxes, the aesthetics of the product are important.

One way to improve the look of a product is to incorporate into it bright color schemes and fancy or even glitzy decor so as to attract and keep a viewer's attention. The application of a lenticular image is one form of such a decor. As here used, a "lenticular image" means a segmented image comprising two or more component images, the segments interlaced in any conventional manner, and mapped (i.e., aligned) to a lenticular lens. In general, lenticular imaging is known, commercially available and described in U.S. Pat. Nos. 5,113,213; 5,266,995; 5,488,451; 5,617,178; 5,847,808; 5,896,230 and 5,967,032 (all of which are incorporated herein by reference), and U.S. application Ser. No. 09/536246.

The incorporation of a decorative surface feature into a molded product is known, e.g., U.S. Pat. Nos. 5,514,427; 5,985,198; 5,972,279; 5,968,444; 5,951,939; 4,906,315; 4,668,558; 4,582,885; 4,576,850 and Re. 36,457 (all of which are incorporated herein by reference).

In general, molded parts are used in a variety of applications and lenticular images provide an attractive and eye-catching way to improve the overall aesthetic appeal of an object to the viewer. Current technology provides for injection molding of colored plastics and plastics which can incorporate such decorative features as, for instance, a "sparkle."

A method for manufacturing a molded article having a decorative surface layer comprising a lenticular image is of interest to the injection molding industry as well as consumers of molded products in general in that it can provide a product that is simply more beautiful or attractive. On another level, the product can be used to communicate a message (inanimate though it may be) via the decorative lenticular image. A method that can promote the integrity of the lenticular image and the lenticular image's adhesion to the molded article while also protecting the optical properties achieved by the lenticular lens surface is desirable.

SUMMARY

According to this invention, a molded article bearing a lenticular image is prepared by an in-mold method comprising the steps of:

A. providing a mold in which to form a molded article;
B. inserting a lenticular image into the mold;
C. introducing a molten plastic into the mold to form the molded article with the lenticular image attached to a surface of the molded article; and
D. removing the molded article with the attached lenticular image from the mold.

In one embodiment of this invention, the molded article is formed by an in-mold method of injection molding in which the lenticular image is placed on the surface of one or both halves of the mold and held in place with a vacuum assist, the molten plastic injected into the mold to create the molded article with the lenticular image attached to the surface of the article, and the mold subsequently opened and the finished article removed.

In another embodiment of this invention, the lenticular image bears a coating over the segmented, interlaced and mapped image that protects the integrity of the image from distortion and/or degradation that would otherwise result from the heat and pressure of the molten plastic during the molding process. In other embodiments of this invention, the temperature and pressure of the molten plastic is selected and/or controlled, and/or the gate placement is selected, such that the integrity of the lenticular image remains undistorted without the need for a protective coating.

DETAILED DESCRIPTION OF THE PREFERRED EMBODIMENT

The preparation of lenticular images is well known in the art. The lenticular image is, by definition, a composite of two or more component images that are preferably of photographic quality. The component images are selected based upon the desired features of the lenticular or final image. The component images are then arranged, segmented, interlaced and mapped to correspond with the lenticular lens in any convenient manner, e.g., such as those taught in U.S. Pat. Nos. 5,488,451; 5,617,178; 5,847,808 and 5,896,230 all of which are incorporated herein by reference. "Correspondence" between an interlaced image and a lenticular lens is achieved when the interlaced image can be viewed properly through the lenticular lens and the viewer perceives the desired visual effect (e.g., motion and/or depth). The image can be printed directly to the flat back surface of a lenticular lens, e.g., such as that taught in U.S. Pat. No. 5,457,515 (which is incorporated herein by reference), or to a substrate (e.g. paper, synthetic paper, plastic, glass, metal or wood) that can be subsequently joined to the lens.

Lenticular lenses typically take the form of a sheet or web. The sheet includes an array of identical curved surfaces that are formed (e.g., embossed, cast, or extruded) on the front surface of a plastic sheet, and the back surface of the lens is typically flat. Each individual lens or lenticule is a section of a long cylinder that typically extends over the full length of the underlying image. The image can be printed directly to the flat back surface of the lens, or alternatively, the lens can be laminated to the image. The lenticular lens is generally selected to accommodate both the image and the distance from which the image will ordinarily be viewed.

Other factors to consider when selecting a lenticular lens include: the lens sheet thickness, its flexibility and, of course, the cost of the lens material. For a large application, such as a snowboard surface, a thick, coarser lenticular lens is usually preferred. For smaller applications, for example, a cup, key chain, necklace charm, or cosmetic or compact disc case, a thin, finer lenticular lens may be preferred. Coarse lenticular lenses have fewer lenticules per linear inch than fine lenticular lenses. The front (i.e., the surface having the identically curved surfaces) can include a protective layer. Alternatively, a "slip sheet" can be used. In either case, the layer or slip sheet can be removed once the lens is shipped from a manufacturer (i.e., an extruder) to an end user.

Figure 1:
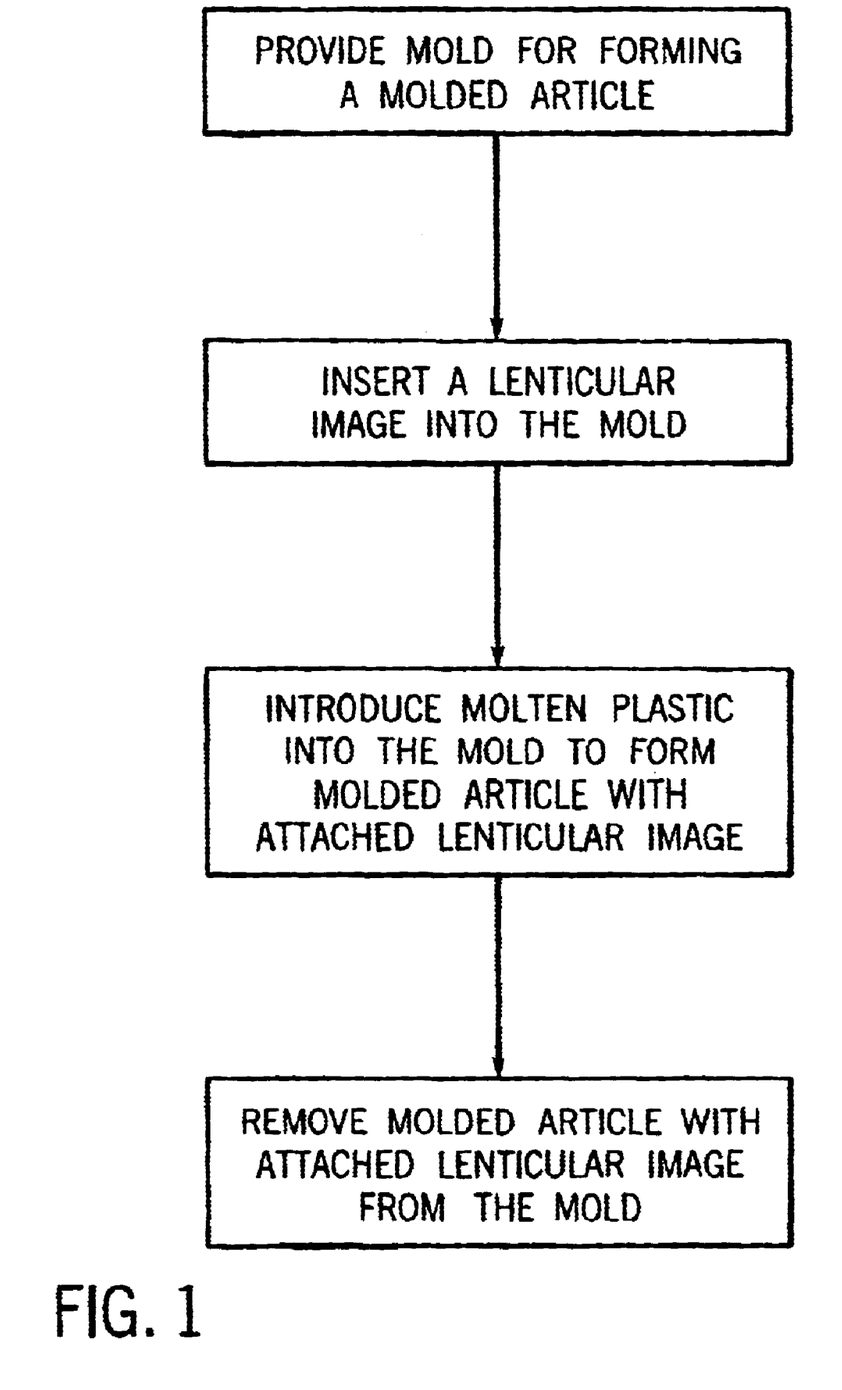
FIG. 1 is a flow chart illustrating one method of making a molded article with a surface bearing a lenticular image.
Figure 2A:
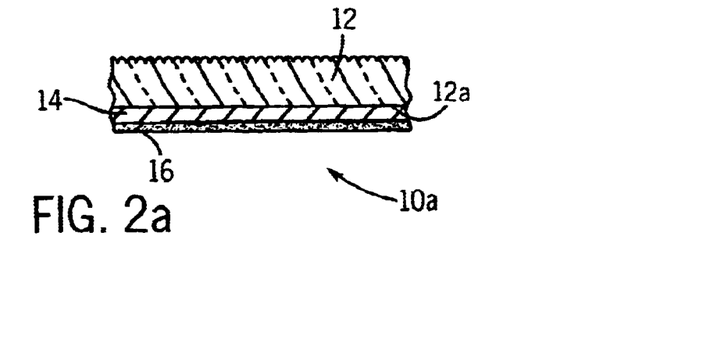
FIGS. 2a–d are cross-sectional views of typical lenticular images.

Shown in FIGS. 2a–d (and similarly, in FIGS. 4 and 5) are cross-sectional views of a few of the various embodiments of a typical lenticular image 10a for use in the present invention. As shown in FIG. 2a, below and adjacent to flat backside 12a of lenticular lens 12, and typically printed upon it, is an image 14 (preferably comprising the interlaced image described above). An optional coating (also called "floodcoating",or "spotcoating") 16, such as a vinyl plastic or opaque white ink can also be applied to enhance, or provide contrast for, the image. This coating can also be used to provide a special effect, for example, a glow-in-the-dark effect. Such an optional coating is described in U.S. Pat. No. 5,896,230, incorporated by reference above.

A coating, such as coating 16, can also serve to protect the lenticular image, (i.e., the lenticular lens itself, the underlying interlaced image, or both). By way of example, the coating can effectively reduce distortion of the image and/or other degradation (e.g., melting of the lenticular lens) that may result from exposure to excessive pressure and/or heat that may be present during a molding process. One such coating, a "silk screen" coating, is disclosed below with reference to a specific embodiment of the invention.

Figure 2B:
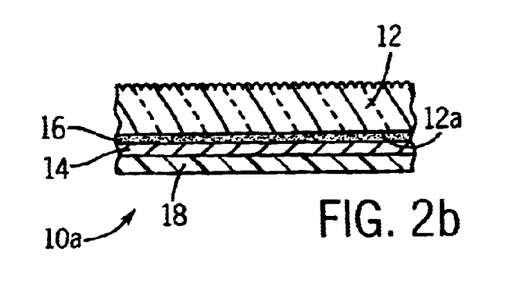

FIG. 2b shows another embodiment of the present invention in which coating 16 (e.g., a clear coating) is applied below and adjacent to flat backside 12a of lenticular lens 12 and image 14 is printed on the coating. Additionally, an optional layer 18 is shown, the layer comprising a substrate or other coating. As described above, this layer can be included to protect the image, for instance, from heat, pressure, and/or turbulence of molten plastic flow.

Figure 2C:
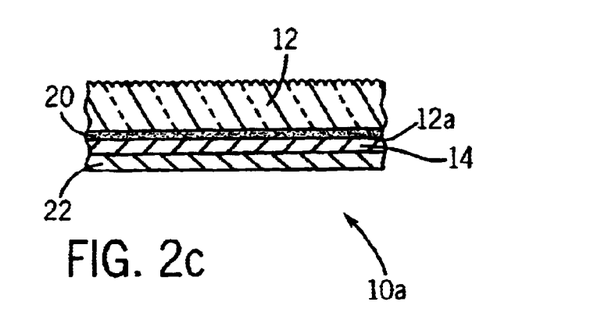
Figure 2D:
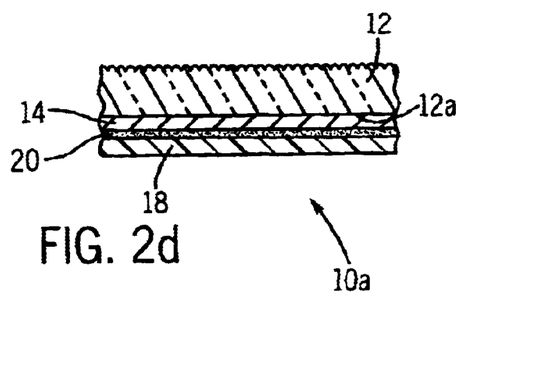

FIGS. 2c–d illustrate two ways in which an adhesive can be applied to the lenticular image 10a. In FIG. 2c, adhesive 20 is applied below and adjacent flat backside 12a of the lenticular lens 12. In this example, image 14 is first printed to substrate 22 and affixed to the lens using the adhesive. As a practical matter, the substrate can be made of wood, metal, glass, or plastic, and the adhesive can be any adhesive compatible with the substrate, coating and/or ink of the segmented and interlaced image. Finally, in FIG. 2d, image 14 is printed to flat back surface 12a of lens 12. The image is affixed using adhesive 20 to layer 18 (again, a substrate or coating).

Figure 4:
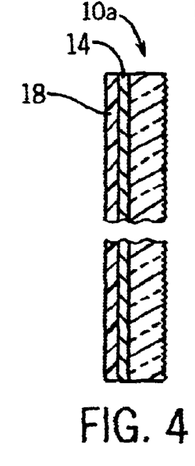
FIG. 4 shows a typical lenticular image joined to an optional layer, the optional layer comprising a protective coating or substrate material.
Figure 5:
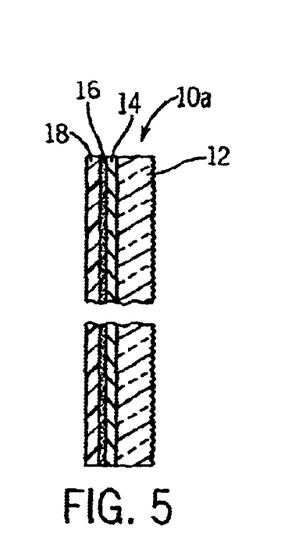
FIG. 5 shows a typical lenticular image having a coating layer and joined to an optional layer comprising, for instance, a substrate material.

FIG. 4 illustrates another cross-sectional view, similar to that of FIGS. 2a–d, of a typical lenticular image 10a comprising a lenticular lens 12, an image layer 14 and having an optional layer 18 comprising a protective layer or substrate. FIG. 5 shows a typical lenticular image 10a having lens layer 12, an image layer 14, with a protective coating layer 16, and an optional layer 18 comprising a coating or substrate material.

The following description of the method of this invention is in the context of an injection molding process. However, the method of this invention is also applicable to other molding processes, such as: flash molding, positive pressure molding, transfer resin molding, and blow molding and others.

Injection molding provides an economical and rapid way to produce high quality precision parts (for example, containers such as a cup or computer case, or for a laptop computer) from a wide variety of plastic materials. Representative of these materials are: polyvinyl chloride, polycarbonate, polystyrene, polyethylene, polypropylene, ABS rubbers, polyethylene terephthalate glycol, acrylic, nylon and RIM urethanes. Polyolefins, homopolymers and co-polymers (ionomers, etc.) are also inexpensive thermoplastic resins that have excellent molding properties and are mentioned here as potentially suitable for use. Additionally, certain thermoplastic elastomers, such as the TPO's (thermoplastic olefin) elastomers, may be employed as desired. Generally, this invention can be viewed as applicable to a variety of molten, solidifyable materials, which, besides plastic, might include materials such as glass. For purposes of the present invention, and as a practical matter, conventional molding equipment may be used and, although not shown, is known to those of skill in the molding art.

In general, plastic granules or pellets are heated until melted, (the melting temperature a function of the plastic, among other things, but typically between about 200 to 500 F). Once melted, the plastic is forced under high pressure (e.g. 10,000 pounds per square inch or more) into a rigid mold press. The mold press is often made of a metal such as aluminum or steel. Once the mold is filled, the molten plastic cools and resolidifies, producing a part with the desired shape and appropriate dimensions.

Figure 6:
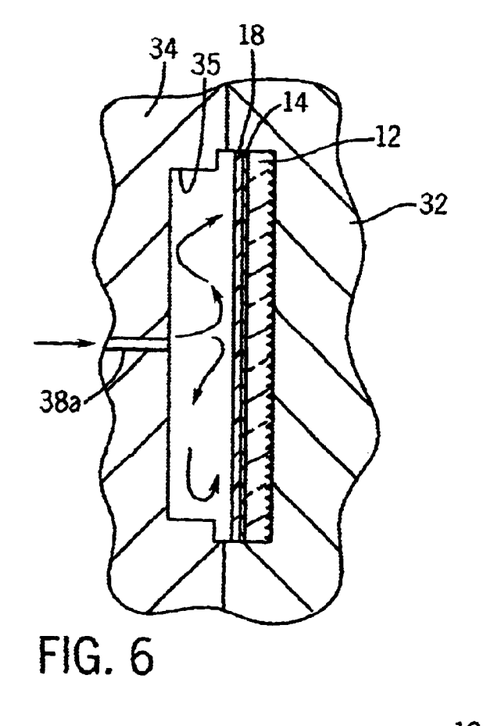
FIG. 6 shows an enlarged version of the lenticular image having an optional layer comprising a protective coating or substrate material disposed within a mold, the view taken along line 6—6 of FIG. 3c. A molten plastic material is shown being introduced using arrows via a typical hook gate arrangement.
Figure 7:
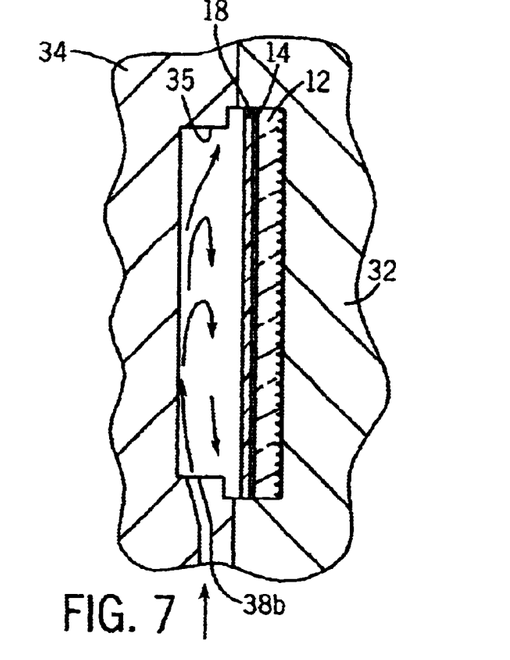
FIG. 7 shows a lenticular image having an optional layer comprising a protective coating or substrate material disposed within a mold. A molten plastic material is shown being introduced using arrows via a typical sub gate arrangement.
Figure 8:
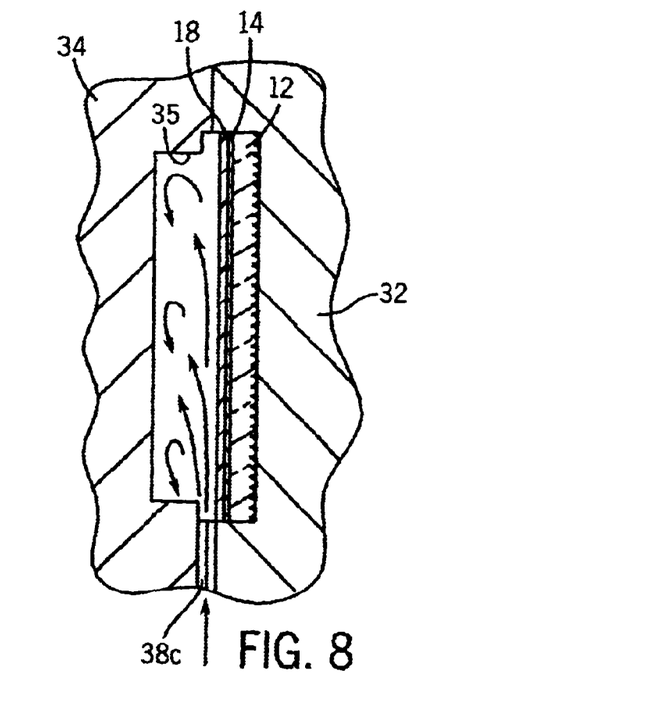
FIG. 8 shows a lenticular image having an optional layer comprising a protective coating or substrate material disposed within a mold. A molten plastic material is shown being introduced using arrows via a typical edge gate arrangement.

Referring to FIGS. 3a–d and FIGS. 6–8, typically a mold 31 comprises a stationary portion 32 and a movable portion 34, the moveable portion capable of being moved from an open position (shown in FIGS. 3a–b) to a closed position (FIGS. 3c–d) having a cavity with a surface 35. At least one of the halves can be equipped with one or more runners or channels for delivering a molten plastic to the cavity via at least one injection gate (FIGS. 6–8, numbers 38a–c, described below). A vacuum assist (or some other means, for instance, static electricity, gravity or tension of the material itself) can be used to hold a part in place, (one such part being a lenticular image of the kind described herein). The injection gates are preferably sized to accommodate the part that is to be manufactured. Such aspects of the present invention (i.e., the size and placement of various items, for instance, the runners and gates) can be determined by those of skill in the art of injection molding.

Referring to FIGS. 6–8, a variety of gate types can be employed to provide molten plastic to the mold in a fashion that reduces deterioration or degradation to the lenticular image (such as, for example, melting of the lenticular lens material, or distortion to the interlaced image itself). These include, but are not limited to, hook gates, edge gates and sub gates. "Hook" gates (for example, a "banana" or "j" hook gate) refer to those gates that provide for molten plastic to flow into the mold cavity generally directly behind (or beneath) the lenticular image (e.g., a side opposite the lenticular lens). A typical hook gate 38a arrangement is shown in FIG. 6.

A typical edge gate 38c arrangement is shown in FIG. 8. "Edge" gates, as used herein, generally refer to those gates that can permit the flow of molten plastic along (or at a seam or gap between) the stationary half and the moveable core.

FIG. 7 shows a typical sub gate 38b arrangement. In this application, "sub" gates refer to those gates that provide molten plastic to be angled away from the image surface (or surface and protective layer) such that the plastic can be injected off of, for instance, the moveable core prior to joining molten plastic with the surface of the lenticular image opposite the lenticular lens. Thus, sub gates can substantially reduce direct contact (or impingement) of molten plastic with the side of the lenticular image bearing the interlaced image.

As such, sub gates are typically preferred to hook gates and edge gates since they provide the needed time for the temperature of molten plastic to decrease prior to contacting the lenticular image (or other backing surface). This, in turn, reduces the potential for deleterious effects on the lenticular image (again, either the lenticular lens itself, the printed interlaced image, or both) due to excessive temperature. In addition, sub gates provide a way to inject molten plastic in a manner that can exert a more controlled and less turbulent flow of molten material along the back surface of the lenticular image.

In alternative embodiments of this invention, the mold is equipped with two or more injection gates, and the placement of the gates (also called ports) can vary to convenience. In certain circumstances, the ports are placed distal or oblique to the lenticular image so as to minimize any distortion or other deleterious effects (e.g., burning) of the image or the lenticular lens itself (e.g., melting) that may result from the heat and/or pressure of the molten plastic.

Figure 3A:
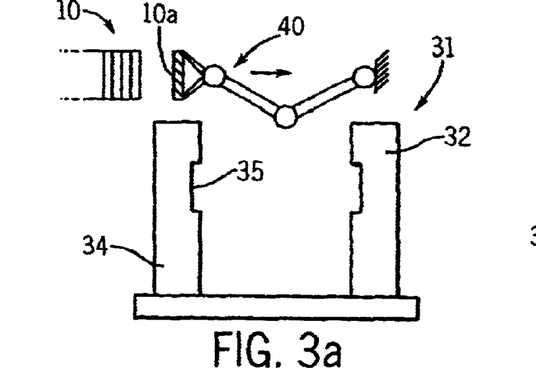
FIG. 3a shows a robotic arm picking or grasping a typical lenticular image from a stack prior to placing the lenticular image into a typical mold, the mold shown in an open position.

Referring to FIGS. 3a–d, in operation, the two halves of the mold begin in an open position, i.e., extended apart from one another. In a preferred embodiment of this invention, a plurality of appropriately sized lenticular images (preferably the images are die cut or similarly portioned from larger sheets) are delivered to an area near the mold in a stack 10 (or alternatively, on a tape), as shown in FIG. 3a. The images can then be removed individually from the stack (or tape) and placed within the mold through a pick-and-place motion of a robotic arm 40.

Figure 3B:
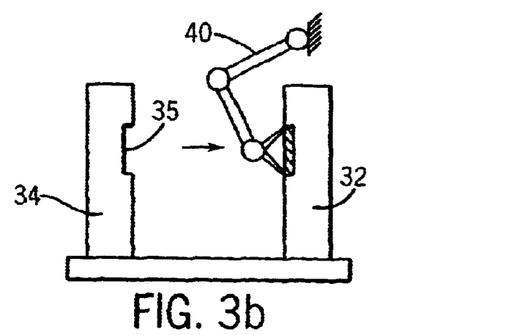
FIG. 3b shows a robotic arm placing a exemplary lenticular image into position within a mold, the mold in an open position, prior to the introduction of molten plastic into the mold.
Figure 3C:
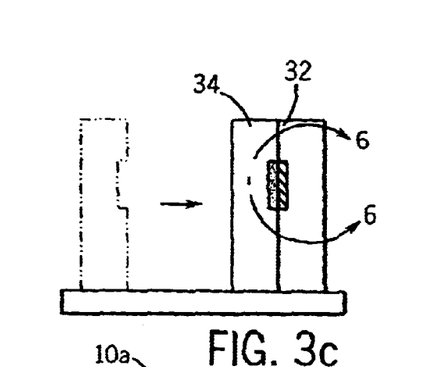
FIG. 3c shows a lenticular image placed within a mold, the mold having a moveable portion and a stationary portion, the moveable portion of the mold moved so that the mold is in a closed position, and molten plastic having been introduced into the mold.

Referring to FIGS. 3a–c, lenticular image 10a is positioned within stationary portion 32 (or alternatively, on moveable core portion 34) and held in place through the action of vacuum assist (or optionally, static electricity—separately or in addition to the vacuum assist—can be used to promote positioning of the lenticular image within the mold). The lenticular image is preferably oriented within the mold such that the lenticular lens is positioned between the interlaced image (which is typically attached to the lens itself as described previously) and the surface of mold half 32 (or the surface of moveable core 34), which is preferably polished. Moveable core portion 34 (also preferably having a polished surface) is then closed (shown in FIG. 3c) upon stationary portion 32, leaving a cavity or gap between the surface of the stationary portion and the core portion into which molten plastic is injected.

Referring to FIGS. 6–8, the molten solidifyable material, i.e., the plastic, is injected (via a variety of gate arrangements, e.g., hook, edge, or sub) in a manner as illustrated by the respective arrows of each Figure. The temperature and pressure are sufficient to ensure proper formation of the molded part without distortion of the lenticular image. Of course, the working temperature and pressure of the molten plastic is a function of a number of variables, e.g., the composition of the plastic, the composition and structure of the lenticular image, etc., but as a practical matter, the temperature and pressure experienced by the surface of the lenticular image exposed to the plastic (e.g., ink, protective coating, substrate, etc.) is sufficiently below that at which the surface deteriorates or otherwise degrades.

As the molten plastic material flows between stationary mold 32 and moveable core 34, it pushes the lenticular part against the stationary mold cavity surface. Thus, a pressure is created by the molten plastic flowing into the mold that exerts a force on the lenticular lens. The lens surface is pushed up against the stationary half, holding it in place. Further, the pressure to promotes better adhesion between the molten plastic and the lenticular part. This action (not shown), coupled with the vacuum assist (or, for example, static electricity), prevents any substantial molten plastic material from flowing between the cavity surface and the decorative surface containing the lenticular lens material.

The mold halves are then cooled. Of course, mold temperatures must be selected such that the molten plastic does not unacceptably degrade the lenticular image, and in particular, the optical properties promoted by the curved surface of the lens. Additionally, the temperature must accommodate the plastic so as to permit it to set sufficiently such that lenticular image is permanently affixed to the surface of the injection molded article.

Figure 3D:
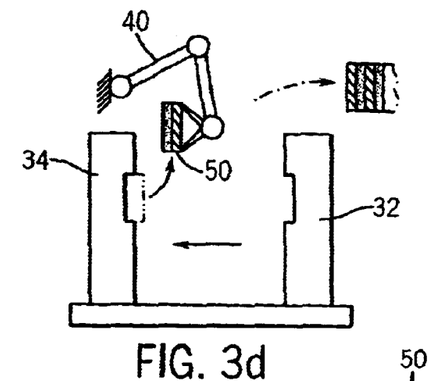
FIG. 3d shows a robotic arm removing a molded article from a mold that is in an open position, the molded article comprising a lenticular image that has been joined with a molten plastic material that has hardened.

Referring to FIG. 3d, once adhesion is achieved and the plastic set and cooled, mold portions 32 and 34 can be separated. The vacuum assist can be disengaged, and the molded article bearing the lenticular image can then be removed using robotic arm 40.

Figure 9:
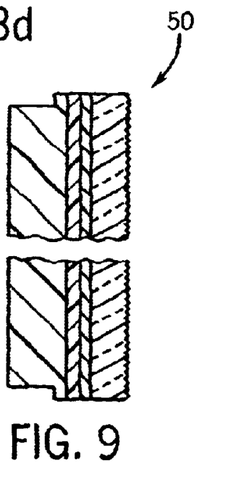
FIG. 9 shows an enlarged cross-sectional view of a molded article.

FIG. 9 shows an enlarged cross-sectional view of a molded article 50 bearing a lenticular image 10a. The multiple layers shown in FIGS. 6–9 generally correspond to those layers described above with reference to FIGS. 2a–d and FIGS. 4–5.

Figures 10, 11:
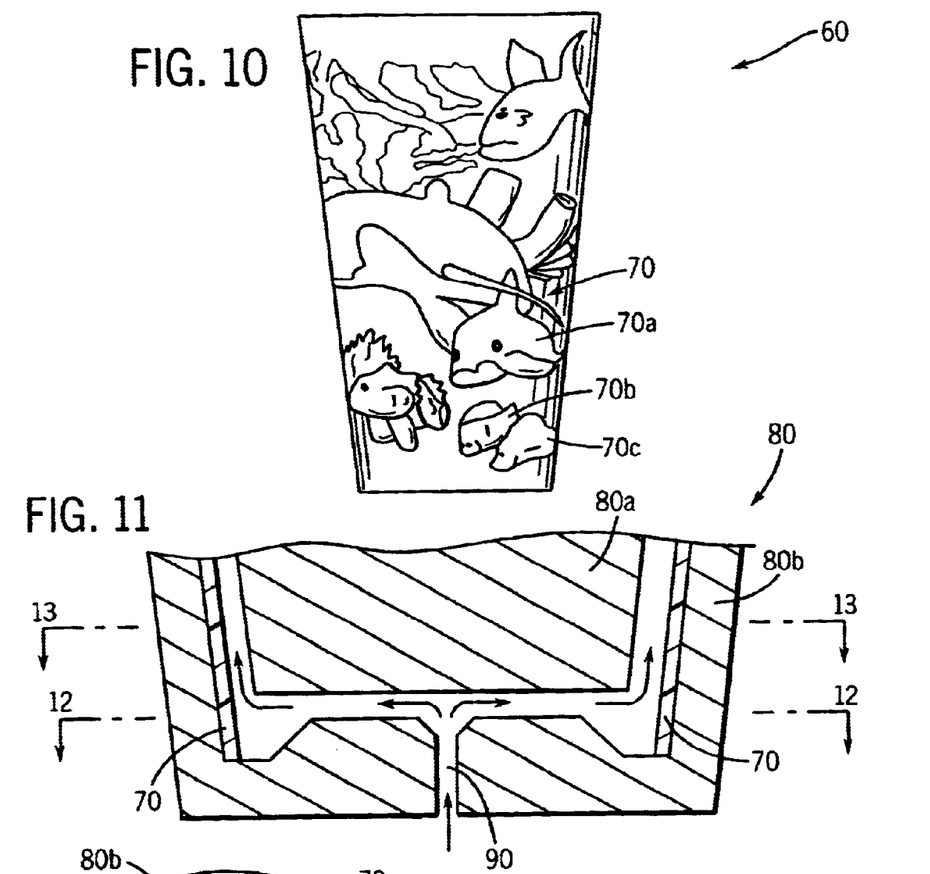
FIG. 10 shows one embodiment of a molded article bearing a lenticular image.
FIG. 11 shows a cross-sectional view of a mold for making the molded article bearing a lenticular image of FIG. 10. A molten plastic material is shown being introduced into the mold using arrows and via a typical gate arrangement. Inside the mold is a lenticular image

FIG. 10 illustrates an injection molded product (i.e., a cup) 60 made in accordance with an embodiment of the present invention, the product having attached to it (or otherwise bearing) lenticular image 70 which itself comprises a plurality of individual elements or images (i.e. fish) 70a, 70b, and 70c, etc. One such cup has at its top end an open, circular, upper diameter of about 3.50 inches, and at its bottom end a smaller, circular diameter of about 2.25 inches, with a frustoconical sidewall depending between the open top and bottom. The cup has a height of about 6 inches. Lenticular image 70 can typically be produced as a lenticular part 10a of the kind described above (e.g., FIGS. 3a–3c). In this case, the part is typically produced and sized as a flat piece that is shaped to accommodate a curved surface of the cup (e.g., as a sleeve). The part can be sized and shaped to cover substantially the entire outer surface of the finished cup, or a portion thereof (e.g., a "belly band"). The lenticular part can be positioned along the inner surface of such a cup as well.

Referring next to FIG. 11, a cross-sectional view of a mold 80 is shown, the mold comprising mold portions 80a and 80b (one of which can be moveable and the other stationary as described above). The mold shown can be used to make the molded product 60 bearing a lenticular image (of FIG. 10). Molten plastic material is shown being introduced into the mold using arrows and via a typical gate arrangement 90 (also shown in FIG. 12). Inside the mold is lenticular image 70. Again, image 70 is typically produced as a part 10a and as shown in FIGS. 3a–3c. Thus, it is noted that image 70 can have various layers as in FIGS. 3a–3c, but, for clarity and simplicity, these layers are not shown in FIG. 11 (or, for that matter, in FIGS. 12 and 13).

Figures 12, 13:
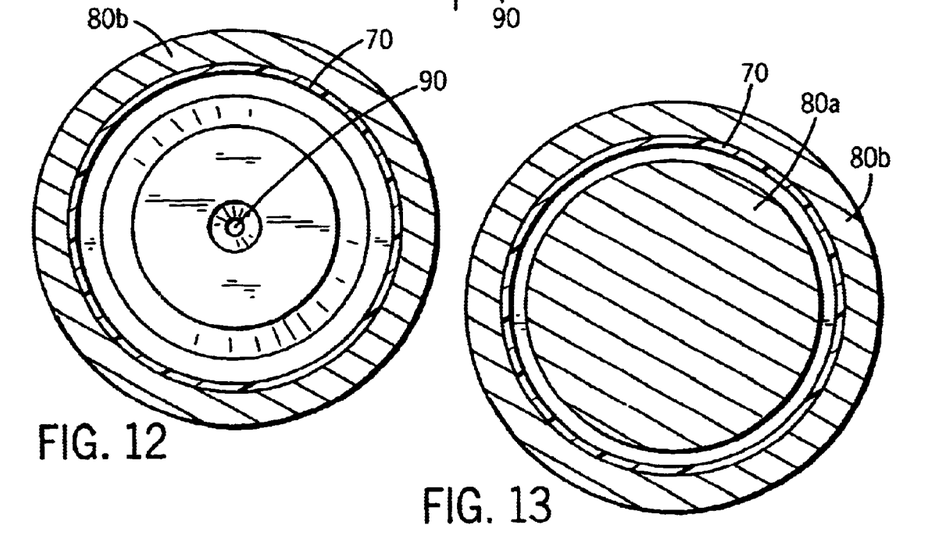
FIG. 12 shows a cross-sectional view of the mold taken along line 12—12 of FIG. 11.
FIG. 13 shows a cross-sectional view of the mold taken along line 13—13 of FIG. 11.

FIGS. 12 and 13 show cross-sectional views of the mold 80 (in FIG. 12, only mold portion 80b is shown) taken along lines 12—12 and 13—13 of FIG. 11, respectively. Lenticular image 70 is also shown (again, without layering). The width of the mold cavity between mold sections 80a and 80b can be clearly viewed in addition to lenticular part 70. Gate 90, through which molten plastic can be injected into the cavity, can also be seen (FIG. 12).

Referring again to FIG. 11, to make the cup bearing a lenticular image 70, plastic can be injected in an indirect fashion, meaning that the plastic is not injected to immediately come in contact with or come up against the lenticular image part. Rather, the molten plastic is first channeled into the mold at a distance from the lenticular image, the distance in this case roughly equal to the radius of the base of the cup. Thus, a surface that does not require decoration (e.g., a lenticular image), such as the bottom of a cup (as is the case here), can be utilized to effectively minimize deleterious effects to the lenticular image. Here, the lenticular image is placed in the mold cavity so as to extend substantially only over what will become the frustoconical sidewall of the finished cup. Using a design such as this, heat and pressure associated the molten plastic can be controlled to a greater extent, and thus, the molten plastic is prevented from harming the lenticular image.

As a practical matter, the placement, including any angling, of any gate(s) tend(s) to be of greater importance than the selection of any particular type of gate (e.g., sub, hook, edge). Gates can be positioned or angled to channel the molten plastic into the mold at a distance from the lenticular image. This, in turn, can serve to protect the image since, as mentioned previously, the heat and pressure of the molten plastic entering the mold can have deleterious effects, both on the image, as well as the lens itself. Also, specific design aspects of the present invention relating to molding technology (i.e., the size, placement and angling of various items, for instance, the runners and gates) can be determined by those of skill in the art of injection molding depending, of course, on the particular project at hand.

Additionally, to ensure proper flow of the molten material (as well as proper temperature, pressure and any associated turbulence of the flow of plastic material), a suitable "mold thickness" must be considered and designed. "Mold thickness" means the annular area in between stationary and moveable mold portions 80a and 80b and more specifically here refers to the width of that section of the mold cavity which ultimately forms the frustoconical sidewall of the cup. To determine an appropriate mold thickness requires accounting not only for the thickness of the end product (i.e., the wall of the cup) but of the lenticular image. In short, the lenticular image (for a typical cup of the kind described here) has a thickness that is not insignificant when compared to the overall mold thickness. In other words, lenticular image has a thickness that cannot be discounted when considering heat, pressure and turbulence of the molten plastic entering the mold cavity.

The pressure and turbulence of water exiting a hose nozzle increases when the cross-sectional area of the hose is decreased. Similarly, the pressure and turbulence of the molten plastic increase as a result of the additional area taken up by the lenticular image part in the mold. Accordingly, mold and product design, as well as gate placement, angling and/or size, must accommodate such factors.

An example of a molded product that can be made in accordance with the present invention is shown in FIGS. 10–13. A cup is shown having a wall thickness of about 82.5 mils. A typical lenticular image (again, comprising a lens, image layer and perhaps a substrate and/or coating layer(s) as described above with respect to FIGS. 2a–d) has a thickness of about 14.5 mils. Thus, in a mold designed for the production of a plastic cup having wall thickness of about 82.5 mils, molten plastic is actually introduced (through a channel such as the one shown in FIGS. 11 and 12) into a mold having reduced thickness of about 68 mils. This reduced thickness corresponds to the annular thickness of the mold cavity less the thickness of the lenticular part.

In contrast, a typical cellular phone cover having a thickness of about 37.5 mils and a lenticular image of about 14.5 mils would result a reduced mold thickness of about 23 mils and thereby resulting in an increased level of turbulence within the mold cavity. Such turbulence has been found in practice to have deleterious effects on the lenticular image, including for example, distortion of the interlaced image. In fact, this distortion can take the form of melting and reflowing the ink of the printed lenticular image. Thus, it may be necessary to redesign the mold so as to accommodate the part thickness (which includes the thickness of the lenticular image) so as to avoid the destructive effects of turbulence.

The mold cavity is typically filled, or "packed" with the molten plastic so as to produce a complete part or article. Without such packing, a portion of the product (e.g., in this case, the sidewall of the cup) may not form properly and/or completely. For any given mold (again, a mold cavity can take varying shapes and contours, as well as utilize a variety of channeling and gate arrangements) and any given type of plastic (e.g., polystyrene) that can be used, a specific quantity "x" of plastic is injected. This quantity is known in the art of injection molding as a "shot" of molten plastic.

The process of "packing" the mold cavity is monitored and controlled here with respect to lenticular to a greater extent when compared with other, nonlenticular molding applications. There is a range, or "window" of quantities of molten plastic that can work to produce a proper, final, complete part, and this range is narrower for lenticular applications when compared to nonlenticualr applications. When a mold is packed too little, that is, with a quantity molten material that is less than "x", it is said to be "short-shot" and/or underfilled. "Short-shooting" typically results in an unfilled mold cavity, and typically, an incomplete part. When a mold is packed too much, it is said to be "over-packed" or filled with a quantity of plastic that is greater than "x". "Over-packing" can result in flattening or distortion of the lenticules of the lenticular lens. Such distortion of the lens can ultimately result in degradation of the underlying image when the image is viewed through the lens. In essence, a balance be must be achieved between "short-shooting" and "over-packing" the mold to produce a complete final injection molded article with a lenticular image attached properly thereto.

Finally, lenticular image 70 (FIGS. 10–13), as described earlier, can preferably include a coating (such as flood coat and other coatings referenced briefly above) to protect the image from the heat and pressure of the molten plastic. In addition, it has been found that, when properly selected, the coating can also accomplish an improved adhesion between the molten plastic and the lenticular image part. One coating that is suitable for use in this invention and which achieves at least these stated benefits is "PLASTIJET XG", a solvent evaporative "silk" screen ink, available from Sericol, Inc., of North Kansas City, Mo. It is also noted here that the image underlying the lenticular lens (the image that can impart an effect such as multidimensionality and/or motion) can itself be printed using the "silk" screen ink, and in doing so, eliminate the need for the separate step of flood-coating the lenticular image.

In an alternative embodiment of the present invention, the lenticular lens of the lenticular image is made in situ. In this embodiment, at least one surface or at least one part of one surface of one of the mold halves is shaped to impart a lenticular lens configuration to a portion of the surface of the molded article. In this embodiment, the image (e.g., an interlaced image suitable for creating the illusion of motion and/or depth), typically printed upon a suitable substrate, is positioned over the part of the mold shaped to impart a lenticular lens configuration to the molded article. Significantly, the image is mapped to the lenticules of the lens. The method as described above is then performed.

It is to be understood that the detailed description (and accompanying drawings) relating to a cup having a frusto-conical cup is provided by way of example only, and is not to be construed in a limited sense with respect to this invention. Indeed, molded articles that can be made by the method of this invention include such diverse items as: containers (for example, cups, bottles, etc.), key chains, necklaces, charms, automobile dashboards, cosmetic or compact disc cases, among others, including those listed above.

The present invention has been described in terms of preferred embodiments. Equivalents, alternatives, and modifications, aside from those expressly stated herein, are possible and are within the scope of the appending claims.

What is claimed is:

1. A method for making a molded article having a lenticular image attached thereto, the method comprising the steps of:

A. providing a mold having a mold cavity in which to form the molded article having a lenticular image, the lenticular image comprising a lenticular lens and interlaced image, the mold cavity having a size that is appropriate to the molded article with the lenticular image;

B. inserting the lenticular image into the mold cavity;

C. introducing a molten plastic into the mold cavity having the lenticular image therein to form the molded article with the lenticular image attached thereto, the molten plastic introduced at least one of a temperature, a pressure, and a turbulence that minimizes any distortion to the lenticular lens and any degradation to the interlaced image; and D. removing the molded article having the attached lenticular image from the mold cavity.

2. The method of claim 1 further comprising the step of delivering a plurality of lenticular images to an area near the mold and inserting at least one of the plurality of lenticular images into the mold using a robotic arm.

3. The method of claim 1 in which the mold has an open cavity defined by a surface and the lenticular image, the lenticular image comprising a lens and an interlaced image, is oriented within the mold cavity such that the lens is positioned along at least part of the cavity surface.

4. The method of claim 1 wherein the lenticular image has a thickness that is not insignificant with respect to the size mold cavity.

5. The method of claim 1 wherein the molten plastic is introduced in a shot size quantity that packs the mold so as to result in little, if any, of at least one of distortion to the lenticular lens and degradation to the underlying image.

6. The method of claim 1 in which the lenticular image further included at least one of a substrate, an adhesive, and a coating.

7. The method of claim 6 in which the substrate comprises one of: paper, synthetic paper, plastic, metal, glass, or wood.

8. A method for making a molded article having a lenticular image attached thereto, the method comprising the steps of:

A. providing a mold having a cavity in which to form the molded article having a lenticular image, the lenticular image comprising a lenticular lens and interlaced image, at least one part of one surface of the mold cavity shaped to impart a lenticular lens to a portion of the at least one surface of the molded article, the mold cavity having a size that is appropriate for the molded article with the lenticular image attached thereto;

B. inserting an interlaced image into the mold cavity, the image positioned over the surface of the mold cavity that is shaped to impart the lenticular lens;

C. introducing at least one type of molten plastic into the mold cavity to form both the molded article and the lenticular lens comprising lenticules on at least part of the at least one surface of the molded article, the interlaced image positioned to correspond to the lenticules of the lens, thereby forming a lenticular image, one of the at least one type of molten plastic introduced at least one of a temperature, a pressure and a turbulence that minimizes any distortion to the lenticular lens and any degradation to the interlaced image; and D. removing the molded article having the attached lenticular image from the mold.

9. The method of claim 1 wherein the interlaced image is printed directly to the lenticular lens.

10. The method of claim 1 wherein the lenticular image is held in place along the cavity surface.

11. The method of claim 1 further comprising the step of cooling the molded article, the article comprising the attached lenticular image, so as to create a finished molded article.

12. A method for making a molded article having a lenticular image integral therewith, the method comprising the step of:

providing a mold having a cavity in which to form the molded article having the lenticular image, the mold cavity having a size that is appropriate to the molded article with the integral lenticular image;

inserting an lenticular image into the mold cavity, the lenticular image comprising a lenticular lens and an interlaced image;

introducing a molten plastic into the mold cavity having the lenticular image therein to form the molded article with the integral lenticular image, the molten plastic introduced at least one of temperature, a pressure, and a turbulence that minimizes any distortion to the lenticular lens and any degradation to the interlaced image; and cooling the molten plastic such that the plastic and the lenticular image form the molded article having the lenticular image integral therewith; and removing the molded article having the integral lenticular image from the mold cavity.

13. The method of claim 12 further comprising introducing the molten plastic into the mold cavity using lenticular image specific gating to form the molded article having the integral lenticular image.

14. The method of claim 13 wherein the introducing step includes packing the mold cavity with molten plastic so as to minimize distortion of the lenticular lens.

15. An in-mold method for making a molded article having an integral lenticular image, the method comprising the step of:

providing a mold having a mold cavity in which to form the molded article having the lenticular image, the lenticular image comprising a lenticular lens and an interlaced image, the mole cavity having a size that is appropriate to the molded article having the lenticular image;

inserting an interlaced image into the mold, the image positioned over at least a portion of a surface of the mold cavity that is shaped to impart the lenticular lens configuration;

introducing at least one type of molten plastic into the mold cavity with the inserted interlaced image;

imparting, with the mold cavity surface portion, the lenticular lens configuration to at least a portion of the at least one type of molten plastic, the interlaced image positioned to correspond to the lenticular configuration, thereby forming the lenticular image;

forming, in the mold cavity a molded article having the lenticular image integral therewith, cooling the at least one type of molten plastic to form the molded article having the integral lenticular image; and removing the molded article having the integral lenticular image from the mold cavity; wherein one of the at least one type of molten plastic is introduced at least one of a temperature, a pressure, and a turbulence that minimizes any distortion to the lenticular lens and any degradation to the interlaced image in the mold cavity.

16. The method of claim 15 further comprising introducing the molten plastic into the mold cavity with lenticular specific gating to form the molded article with the integral lenticular image, thereby accommodating the lenticular image.

* * * * *

UNITED STATES PATENT AND TRADEMARK OFFICE
CERTIFICATE OF CORRECTION

PATENT NO.    : 6,635,196 B1
DATED         : October 21, 2003
INVENTOR(S)   : Timothy P. Goggins It is certified that error appears in the above-identified patent and that said Letters Patent is hereby corrected as shown below:

Column 10,
Line 36, delete "A."
Line 42, delete "B."
Line 43, delete "C."
Line 46, replace "at" with -- at at --.
Line 50, delete "D."

Column 11,
Line 2, replace -- included -- with "includes".
Line 9, delete "A."
Line 17, delete "B."
Line 20, delete "C."
Line 27, replace "at" with -- at at --.
Line 30, delete "D."
Line 43, replace "step" with -- steps --.
Line 44, insert -- mold -- after the second occurrence of "a" and before "cavity".
Line 48, replace "an" with -- a --.
Line 54, insert -- a -- before "temperature".

Column 12,
Line 19, replace "step" with -- steps --.
Line 23, replace "mole" with -- mold --.
Line 44, replace "at" with -- at at --.

Signed and Sealed this

Twelfth Day of October, 2004

JON W. DUDAS
*Director of the United States Patent and Trademark Office*